US009461817B2

(12) United States Patent
Moore et al.

(10) Patent No.: US 9,461,817 B2
(45) Date of Patent: Oct. 4, 2016

(54) METHOD AND SYSTEM FOR ENCRYPTING JAVASCRIPT OBJECT NOTATION (JSON) MESSAGES

(75) Inventors: Timothy Walter Moore, Pflugerville, TX (US); Patrick Ryan Wardrop, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1255 days.

(21) Appl. No.: 12/356,305

(22) Filed: Jan. 20, 2009

(65) Prior Publication Data

US 2010/0185862 A1  Jul. 22, 2010

(51) Int. Cl.
*H04L 9/32* (2006.01)
*G06F 21/00* (2013.01)
*H04L 9/08* (2006.01)

(52) U.S. Cl.
CPC ............ *H04L 9/08* (2013.01); *H04L 2209/56* (2013.01); *H04L 2209/805* (2013.01)

(58) Field of Classification Search
CPC ............................ H04L 9/08; H04L 2209/56
USPC ........................................................ 713/171
See application file for complete search history.

(56) References Cited

U.S. PATENT DOCUMENTS

2009/0307284 A1* 12/2009 Welingkar .......... G06F 11/1451

OTHER PUBLICATIONS

"XML Encryption Syntax and Processing", W3C Recommendation, Dec. 10, 2002, http://www.w3.org/TR/2002/REC-xmlenc-core-20021210/.*
Rubio, D., "JavaScript Object Notation for Ajax Web services", http://searchsoa.techtarget.com/tip/JavaScript-Object-Notation-for-Ajax-Web-services.*
Schwartz, Michael, "JSON Hijacking and How Ajax.net Professional (AjaxPro) Avoids these Attacks," Apr. 7, 2007.
Yoshihama et al., "Overcome security threats for Ajax applications," Jun. 19, 2007.
"JSON vs. XML: Browser Security Model," Jan. 2, 2007.

* cited by examiner

*Primary Examiner* — Alexander Lagor
(74) *Attorney, Agent, or Firm* — Gail H. Zarick; David H. Judson

(57) ABSTRACT

The confidentiality of JavaScript Object Notation (JSON) message data is secured using an encryption scheme. The encryption scheme implements a JSON encryption syntax, together with a set of processing rules for creating encrypting arbitrary data in JSON messages in a platform/language independent manner. A method for encrypting a data item in a JSON message begins by applying an encryption method and a key to the data item to generate a cipher value. A data object is then constructed that represents an encryption of the data item. The data item in the JSON message is then replaced with the data object, and the resulting modified JSON message is then output from a sending entity. At a receiving entity, information in the data object is used to re-generate the data item, which is then placed back in the original message.

21 Claims, 3 Drawing Sheets

METHOD AND SYSTEM FOR ENCRYPTING JAVASCRIPT OBJECT NOTATION (JSON) MESSAGES

CROSS-REFERENCE TO RELATED APPLICATIONS

This application is related to Ser. No. 12/356,290, filed Jan. 20, 2009, titled "Method and system for signing JavaScript Object Notation (JSON) Messages".

BACKGROUND OF THE INVENTION

1. Technical Field

This disclosure relates generally to securing data messages over a communication network.

2. Background of the Related Art

Asynchronous JavaScript and XML (collectively referred to as AJAX) are well-known technologies that allow user interaction with Web pages to be decoupled from the Web browser's communications with a Web server. AJAX is built upon dynamic HTML (DHTML) technologies including: JavaScript, a scripting language commonly used in client-side Web applications; the Document Object Model (DOM), a standard object model for representing HTML or XML documents; and Cascading Style Sheets (CSS), a style sheet language used to describe the presentation of HTML documents. In AJAX, client-side JavaScript updates the presentation of a Web page by dynamically modifying a DOM tree and a style sheet. In addition, asynchronous communication, enabled by additional technologies, allows dynamic updates of data without the need to reload the entire Web page. These additional technologies include XMLHttpRequest, an application programming interface (API) that allows client-side JavaScript to make HTTP connections to a remote server and to exchange data, and JavaScript Serialized Object Notation (JSON), a lightweight, text-based, language-independent data-interchange format.

JSON is based on a subset of the JavaScript Programming Language, Standard ECMA-262, $3^{rd}$ Edition, dated December 1999. It is also described in Request for Comment (RFC) 4627. JSON syntax is a text format defined with a collection of name/value pairs and an ordered list of values. JSON is very useful for sending structured data over the wire (e.g., the Internet) that is lightweight and easy to parse. It is language-independent but uses conventions that are familiar to C-family programming conventions. Further information about JSON can be found as json.org.

Currently, JSON messages are secured over the wire using mere transport security (such as SSL), which only provides point-to-point message security. The data in the message, however, is provided in the clear and, as a result, such data can still be compromised through various means, such as by malicious altering by an attacker, or accidental altering through transmission errors.

There remains a need to add data confidentiality protection to JSON messages.

BRIEF SUMMARY OF THE INVENTION

The privacy of JSON message data is secured using an encryption scheme. The encryption scheme implements a JSON encryption syntax, together with a set of processing rules for encrypting arbitrary data in JSON messages in a platform/language independent manner.

According to one feature, a machine-implemented method for encrypting a data item in a JavaScript Object Notation (JSON) message begins by applying an encryption method and a key to the data item to generate a cipher value. A data object is then constructed that represents an encryption of the data item. The data item in the JSON message is then replaced with the data object, and the resulting modified JSON message is then output. Preferably, the data object is constructed according to a syntax, which defines a set of one or more elements. These elements includes at least one of a first element that includes information associated with the encryption method; a second element that includes data associated with the key; a third element that includes data associated with the cipher value generated by applying the encryption method and the key to the data item; and a fourth element that includes data associated with an encrypted version of the key. By organizing or applying these elements in various ways to the message contents, an encryptor can encrypt any JSON object, array, string, or other artifact within the JSON message, or any combination of such data, or the JSON message itself.

The above-described functionality can be used to implement an end-to end system wherein entities communicate JSON messages to one another over a network. In this aspect, a sending entity comprising a calling application (such as a Web browser), and an encryptor that constructs a data object for at least one data item in a JSON message. The data object includes information on how to decrypt data associated with the data object to obtain the data item. In operation, the encryptor replaces the data item in the message with the data object and provides a resulting modified JSON message to the calling application. The system also includes a receiving entity comprising a calling application (such as a Web server) that receives the modified JSON message, and a decryptor. The decryptor uses the information in the data object to decrypt the data associated with the data object to obtain the data item. The decryptor then replaces the data associated with the data object with the data item to obtain the original JSON message, which it then provides to the application.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
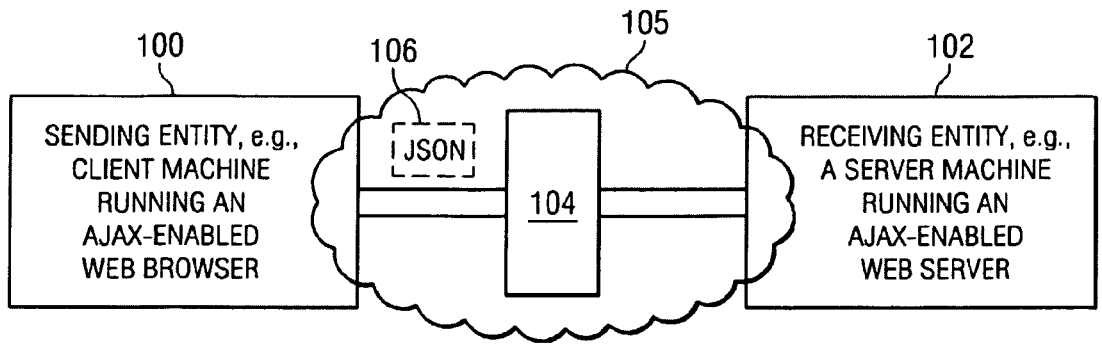
FIG. 1 depicts a networking environment wherein JSON messages are communicated from a sender to a receiver and in which the subject disclosure may be implemented.

In a typical scenario, illustrated in FIG. 1, JSON messages are sent from an initial sender 100 to an ultimate receiver 102 along a JSON message path comprising zero or more intermediaries 104. The devices 100, 102 and 104 are computing entities, such as data processing systems each comprising hardware and software, which entities communicate with one another over a network, such as the publicly-routed Internet 105 (in this example), an intranet, an extranet, a private network, a wireless link, or any other communications medium or link. As described below, a data processing system typically comprises one or more processors, an operating system, one or more applications and one or more utilities. A given data processing system may be a sender or sending entity, in which case the system is deemed to be on a "sender side" of the transmission, or a receiver or receiving entity, in which case the system is deemed to be on a "receiver side." JSON messages, such as message 106, may flow in either direction. Typically, the sender 100 includes a Web browser, and the receiver 102 includes a Web server, or vice versa. In AJAX, client-side JavaScript updates the presentation of a Web page displayed in the browser by using the XMLHttpRequest API (or the like) to communicate to server asynchronously, with the resulting request/response typically involving the exchange of one or more JSON (or other structured data) messages. In the prior art, the JSON messages are delivered over the wire in the clear, although point-to-point security typically is used (between sender and receiver) using transport layer security mechanisms, such as HTTP over TLS (Transport Layer Security). In a typical scenario, the sending entity is a client machine executing an AJAX-enabled Web browser, and the receiving entity is a server machine executing an AJAX-enabled Web server. By "AJAX-enabled," a particular device has the capability of creating and processing messages using AJAX technologies. Of course, these are merely representative data processing systems.

By way of additional background, known JSON syntax is built on two structures: a collection of name/value pairs, and an ordered list of values. The collection of name/value pairs goes by different nomenclature depending on the language involved, and this structure typically is realized as an object, a record, a struct, a hash table, a keyed list or an associative array. For discussion purposes, the object nomenclature will be used. The ordered list of values also goes by different nomenclature depending on the language involved, and this structure typically is realized as an array, a vector, a list or a sequence. For discussion purposes, the array nomenclature will be used.

"An object is an unordered set of name/value pairs. An object begins with "{" (left brace) and ends with "}" (right brace). Each name is followed by ":" (colon) and the name/value pairs are separated by "," (comma):

object ={string:value }.

An array is an ordered collection of values. An array begins with "["(left bracket) and ends with "]" (right bracket). Values are separated by "," (comma):

array =[value ].

A value can be a string in double quotes, or an object, or an array. These structures can be nested, such as value =string ||object|| array.

Figure 2:
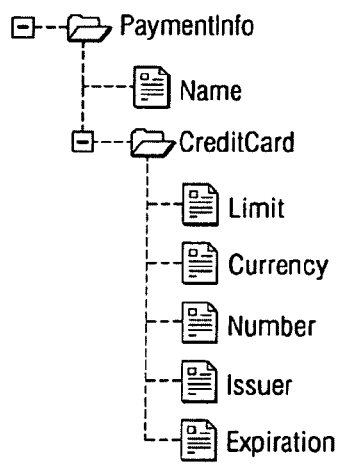
FIG. 2 is a first JSON request message represented in a tree format to illustrate the hierarchical nature of the message.
Figure 3:
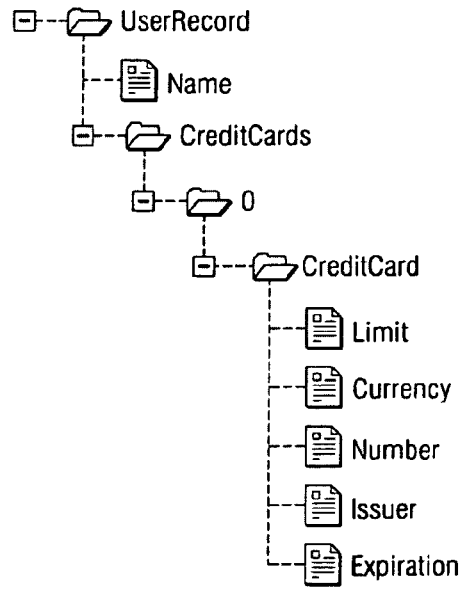
FIG. 3 is a second JSON request message represented in the tree format.

FIG. 2 illustrates a representative first JSON message 200 in a tree format. This message is illustrated in its tree format to show the hierarchical nature of the message according to the above-described JSON syntax. In this example, a Payment Info object is the top level key of the message, which also includes a CreditCard data object with a number of attributes: Limit, Currency, Number, Issuer and Expiration. In this example, the notation PaymentInfo.CreditCard identifies the credit card information under the payment information. FIG. 3 illustrates a second JSON message 300 in a tree format. In this example, a UserRecord object includes a CreditCard array. The notation UserRecord. CreditCards [0]. CreditCard represents the credit card information in the first element of the array of credit card. All elements of a message can be identified by this type of notation. Duplicate keys at the same level are not allowed because JSON artifacts are a collection of name/value pairs; thus, the notation is guaranteed to be unique.

The following Example 1 illustrates the actual JSON message that corresponds to the tree representation in FIG. 2:

```
{ "PaymentInfo": {
    "Name":"John Smith",
    "CreditCard": {
        "Limit":"5,000",
        "Currency":"USD",
        "Number":"4019 ... 1234",
        "Issuer":"Example Bank",
        "Expiration":"04\/02"
    }
  }
}
```

The following Example 2 illustrates the actual JSON message that corresponds to the tree representation in FIG. 3:

```
{ "UserRecord": {
    "Name":"John Smith",
    "CreditCards": [ {
        "CreditCard": {
            "Limit":"5,000",
            "Currency":"USD",
            "Number":"4019 ... 1234",
            "Issuer":"Example Bank",
            "Expiration":"04\/02"
        },
        "CreditCard": {
            "Limit":"25,000",
            "Currency":"USD",
            "Number":"2115 ... 1234",
            "Issuer":"Example Bank",
            "Expiration":"04\/02"
        }
    } ]
  }
}
```

These sample messages will be used below to illustrate the principles of the JSON encryption syntax according to this disclosure.

According to this disclosure, encryption is applied to any part or the whole JSON message that includes JSON (object, array or string) artifacts. The following Table 1 describes a JSON Encryption syntax according this disclosure. The JSON Encryption comprises a set of properties that are described as follows:

| Property/element/object | Description |
| --- | --- |
| EncryptedData | This is a required element that is a container for information describing the encrypted data. |
| VersionId | This optional element describes the namespace for the EncryptedData element. The VersionId allows for future EncryptedData format and processing changes. |
| Id | An EncryptedData element could have an optional Id for identification purposes and retrieval. |
| EncryptionMethod | This is a required element describing the algorithm used for encryption and optionally the data type of the object encrypted. |
| Type | A child element of EncryptionMethod that is a URI that identifies the data type encrypted. |
| Algorithm | A child element of EncryptionMethod that is a URI that identifies the encryption algorithm used for the encrypted data or encrypted key. |
| KeyInfo | The element that contains information needed to retrieve the decryption key. |
| CipherData | A required element that contains a CipherValue. |
| CipherValue | A base64 encoded string of an encrypted octet sequence. |
| EncryptedKeys[ ] | An array of EncryptedKey elements. |
| EncryptedKey | An optional element that describes information on an encrypted key that when decrypted can be used to decrypt the EncryptedData CipherValue. This element can be a child of KeyInfo and EncryptedKeys[ ]. |
| VersionId | This optional element describes the namespace for an EncryptedKey element. The VersionId allows for future EncryptedKey format and processing. |
| Id | An EncryptedKey may have an optional Id for identification purpose and retrieval. This element is used when the EncryptedKey is a child element of EncryptedKeys[ ]. |
| ReferenceList[ ] | An array of data references that identify the encrypted data to which this key can be applied. |

When encrypting data in the JSON message, the resulting data is replaced by a new JSON object. This object is referred to as an EncryptedData object. The EncryptedData object has information in it regarding how to decrypt the data to get the original JSON message data. In particular, typically, the EncryptedData object includes one or more other JSON syntax objects, such as VersionId, EncryptionMethod, and CipherData. A VersionId object is used to identify a version of the JSON encryption element, typically specified as a URI. The KeyInfo element typically defines one or more parameters (e.g., name, value, retrieval method, and the like) for the keys used to encrypt and/or decrypt. These parameters may themselves be specified or structured as separate JSON objects (e.g., such as KeyName, KeyValue, RetrievalMethod, and the like). The EncryptionMethod object identifies the particular encryption algorithm, typically specified as a URI, which is to be used for the encryption. The CipherData object is an element that identifies a cipher value that results from applying the encryption algorithm to the data, and the cipher value itself may be a structured element. An EncryptedKey object may be used to specify how to build an encrypted key. The nomenclature set forth above should not be taken as limiting. Thus, for example, any of the above-identified objects may be generalized into "first," "second" and "third" objects or elements without loss of generality. Also, the term "object" in the context of the JSON encryption syntax described herein may also be referred to as an "element" without loss of generality.

Figure 4:
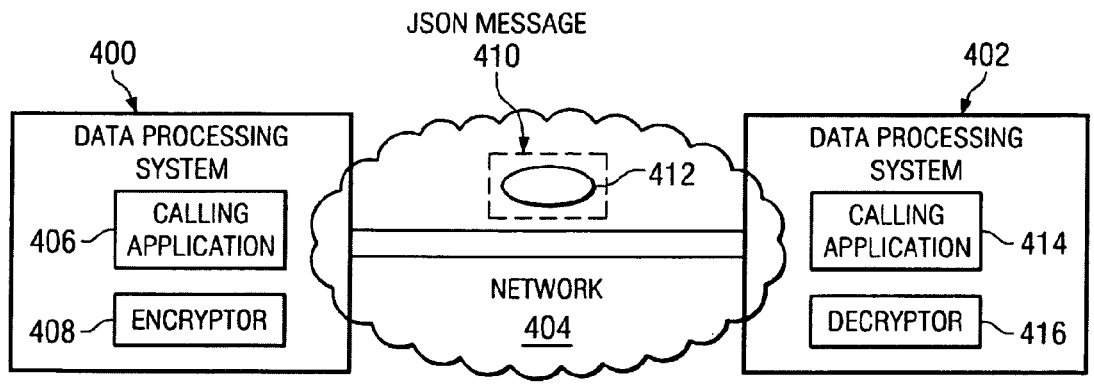
FIG. 4 illustrates a representative computing environment in which the principles of the present invention are implemented.

FIG. 4 illustrates the basic operation in the context of a computing environment that includes a data processing system 400 that is in communication with a data processing system 402 over a network 404, such as the Internet. Data processing system is machine executing an application 406, such as an AJAX-enabled Web browser, together with an encryptor 408, which is a computer-implemented routine that provides the encryption function as well be described below. The JSON message 410 that includes the EncryptedData object 412 is output from the data processing system 400 and sent to the data processing system 402, which includes an application 414, such as a Web server, together with a decryptor 416, which is a computer-implemented routine the provides a decryption function as will be described below. The encryptor and decryptor routines are conveniently implemented in software, as a set of program instructions that are executable in a processor. More generally, the words "encryptor" and "decryptor" are merely role names for one or more software processes, and the "application" simply refers to a software program. Of course, the application is not limited to a Web browser or Web server, as the encryptor and/or decryptor functions may be called from any calling application.

Figure 5:
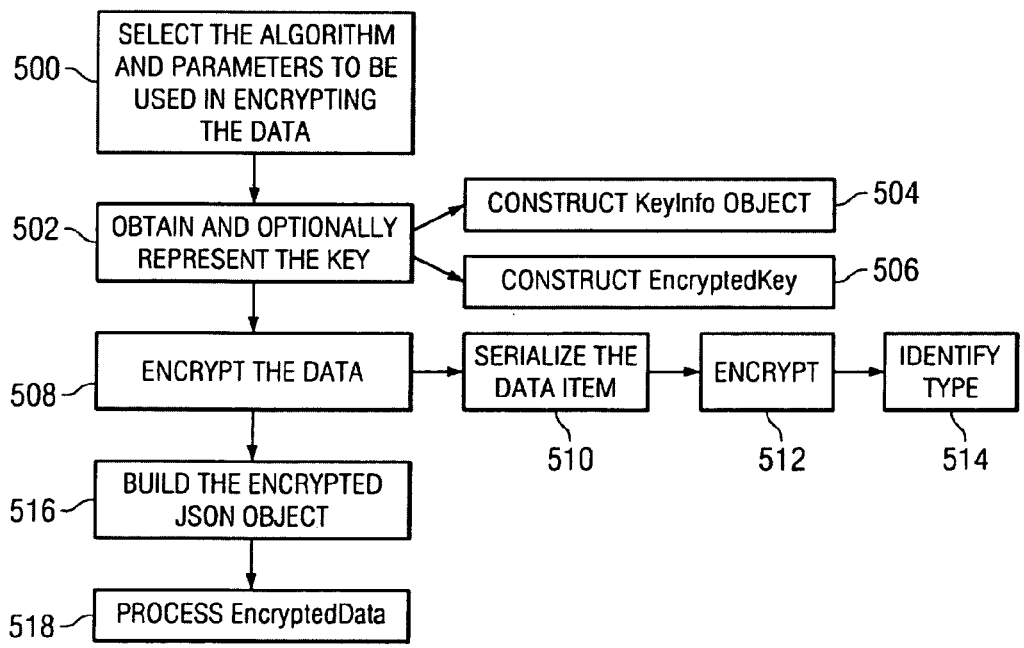
FIG. 5 illustrates an encryptor function according to the present invention.

With reference now to FIG. 5, a process flow diagram is shown illustrating how to encrypt a data item according to the subject matter described herein. As used herein, and as noted above, a "data item" may be any JSON object, array, string, or other artifact within the JSON message, or any combination of such data, or the entire JSON message itself. The encryption process illustrated in FIG. 5 is repeated for each data item to be encrypted in the message, and as will be seen it can also be used to encrypt the key that is used for encryption if such encryption is desired.

For each data item to be encrypted as an EncryptedData or EncryptedKey, the encryptor performs the following machine-implemented method. The method begins at step 500 by selecting an algorithm (and parameters) to be used in encrypting the data item. At step 502, the routine obtains and (optionally) represents the key that will be used for encryption. Thus, if the key is to be identified in the JSON message itself, at step 504 the routine constructs a KeyInfo element with the appropriate parameters (e.g., KeyName, KeyValue, RetrievalMethod, and the like). If the key itself is to be encrypted, at step 506 the routine constructs an EncryptedKey JSON object, preferably by recursively applying the encryption process. The result of recursively applying the encryption process may then be used as a child element of KeyInfo, or the result may be positioned at the root of the JSON document tree, e.g., in a list of EncryptedKeys.

After step 502 is completed, the routine continues at step 508, which is a sub-loop used to encrypt the data item. In particular, at step 510 the routine obtains a series of octets by serializing the data item in UTF-8. As is well-known, UTF-8 (8-bit. UCS/Unicode Transformation Format) is a variable-length character encoding for Unicode. UTF-8 encodes each character in one to four octets (8-bit bytes). In the context of data storage and transmission, serialization is the process of converting a data item into a sequence of bits so that it can be stored on a storage medium (such as a file, or a memory buffer) or transmitted across a network connection link. When the resulting series of bits is re-read according to the serialization format, it can be used to create a semantically identical clone of the original data item. The process of serializing a data item is also known as deflating or marshalling; the opposite operation, namely, extracting a data item from a series of bytes, is known as deserialization (inflating or unmarshalling). Serialization may be done by the encryptor; if the encryptor does not serialize, then the application should perform the serialization. If the data item is of any other type that is not already in octet form, the application should serialize the data item as octets.

At step 512, the routine encrypts the octets using the algorithm (identified in step 500) and the key obtained in step 502. At step 514, the encryptor identifies a data item "type." This operation is desired unless the decryptor knows (explicitly or implicitly) the type of the data item being encrypted. The definition of the "type" is preferably bound to an identifier (e.g., through a URI) and specifies (to the decryptor) how to obtain and interpret the plaintext octets after decryption. The type specified indicates the return type of JSON artifact of the parsed JSON plaintext. In particular, the encryption method type identifies the underlying JSON data type encrypted so as to simplify the decryption processing. JSON libraries have classes that can parse a JSON string and turn it into a JSON object, and that can serialize a JSON object to a JSON string. There are different JSON object data types (JSONObject, JSONArray). Knowledge of the type of data allows the decryption process to use the methods supplied by JSON libraries and thereby construct the resulting JSON message after decryption. This completes the data encryption sub-loop 508.

The routine then continues at step 516 to build the EncryptedData or EncryptedKey JSON object. The EncryptedData JSON object represents the information described above used to encrypt the data item, including the type of the encrypted data, encryption algorithm, key, and the like. If the encrypted octet sequence obtained in step 508 is to be stored in the CipherData element within the EncryptedData or EncryptedKey JSON object, then the encrypted octet sequence is encoded (e.g., through base 64 encoding) and inserted as the content of a CipherValue element.

Figure 7:
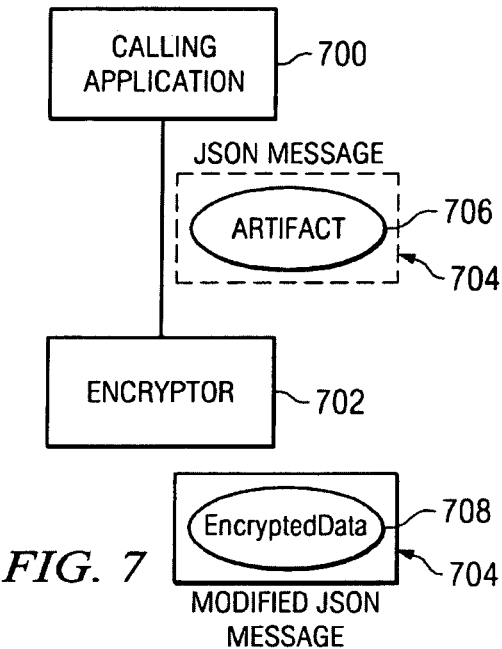
FIG. 7 illustrates how a calling application uses the encryptor function.

The routine then continues a step 518 to process the EncryptedData object. In one embodiment, the encryptor returns the EncryptedData JSON object to the application. The application then uses the EncryptedData object as a top-level element in a new JSON message, or inserts the object into another JSON message. More typically, and according to another embodiment, it is the encryptor that replaces the unencrypted JSON artifact (the data item) with the EncryptedData object. In particular, and as shown in FIG. 7, when an application 700 requires a JSON artifact to be replaced, the application 700 supplies the encryptor 702 the JSON message 704 in addition to identifying the JSON artifact 706 to be replaced. The JSON artifact can be identified using notation as described above. After creating the EncryptedData JSON object 708, the encryptor 702 removes the identified JSON artifact 706 and inserts in its place the EncryptedData JSON object 708.

This completes the encryption process.

Figure 6:
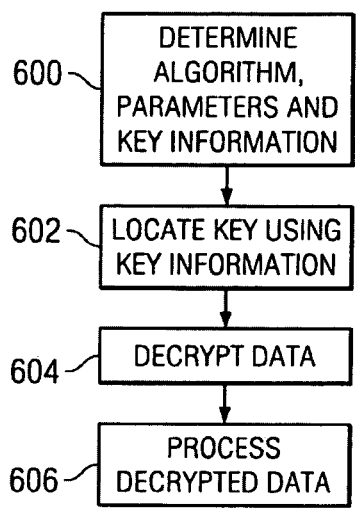
FIG. 6 illustrates a decryptor function according to the present invention.

FIG. 6 is a process flow diagram that illustrates a decryption process for each EncryptedData or EncryptedKey to be decrypted. As noted above, this function is carried out by a decryptor, typically on a data processing system that receives the JSON message having the EncryptedData Or EncryptedKey object.

The routine begins at step 600 to process the JSON object to determine the algorithm, parameters and KeyInfo element to be used for the decryption. If some information is omitted, the application that calls the decryptor must supply it. At step 602, the routine locates the data encryption key according to the KeyInfo element, which (as noted above) may contain one or more children elements. These children typically have no implied processing order. If the data encryption key is encrypted, the routine locates the corresponding key in order to decrypt it. This may be a recursive step, as the key-encryption key itself may be encrypted. Or, the routine may retrieve the data encryption key from a local data store using the provided attributes or implicit binding identified in the element.

At step 604, the routine decrypts the data contained in the CipherData element. In particular, if a CipherValue child element is present, then the associated text value is retrieved and decoded (e.g., by base 64 decoding) to obtain the encrypted octet sequence. The encrypted octet sequence is then decrypted using the algorithm, parameters and key value already determined from steps 600 and 602. Thereafter, and at step 606, the decrypted data is processed. In particular, the cleartext octet sequence obtained in step 604 is interpreted, e.g., as UTF-8 encoded character data. The decryptor must be able to return the "type" value and the UTF-8 encoded JSON character data. The decryptor may also perform validation on the serialized JSON object. Preferably, the decryptor also replaces the EncryptedData object with the decrypted JSON artifact represented by the UTF-8 encoded characters. The decryptor or some other function may also perform a validation on the result of this replacement operation. Typically, the application supplies the JSON message context and identifies to the decryptor the EncryptedData object being replaced. If the JSON document into which the replacement is occurring is not UTF-8, the decryptor transcodes the UTF-8 encoded characters into the target encoding.

This completes the decryption process.

"The following are representative examples that illustrate how the JSON encryption syntax and processing rules generate protected JSON messages according to the techniques disclosed herein. URLs specify "http:" (omitted for clarity)."

Example 3 below represents the JSON message of Example 1 following encryption. In this example, The EncryptedData JSON object represents the encrypted CreditCard information. The EncryptionMethod describes the type of encrypted JSON data and the applied encryption algorithm, which (in this example) is triple DES (Data Encryption Standard). The KeyInfo contains the information that is needed to retrieve the decryption key, which (in this example) is a shared secret key represented by the KeyName object. The CipherValue contains the cipher text that is obtained by serializing and encrypting the CreditCard information:

```
{ "PaymentInfo": {
    "Name":"John Smith",
    "EncryptedData": {
        "VersionId":"http://www.ibm.com/2008/09/
            jsonenc#EncryptedData",
        "EncryptionMethod": {
            "Type":"http://www.ibm.com/2008/09/
                jsonenc#object",
            "Algorithm":"//www.ibm.com/.../
                jsonenc#tripledes-cbc"
        },
        "KeyInfo": {
            "KeyName":"shared secret key name"
        },
        "CipherData": {
            "CipherValue":"ydUNqHkMrD..."
        }
    }
  }
}
```

In Example 3 above, it is assumed that both the sender and recipient have a common secret key. If the recipient has a public and private key pair, which is most likely the case, the Creditcard information can be encrypted as shown in Example 4 below. In this example, the symmetric key is derived by the encryptor (it is not a pre-established secret); the symmetric key is encrypted with the public key of the recipient, and output is stored in EncryptedKey. This allows for the encrypting process to "share" the symmetric key on-the-fly rather than having it as a pre-established secret. It also allows the encryptor to limit the number of recipients:

```
{ "PaymentInfo": {
    "Name":"John Smith",
    "EncryptedData": {
        "VersionId":"http://www.ibm.com/2008/09/
            jsonenc#EncryptedData",
        "EncryptionMethod": {
            "Type":"//www.ibm.com/2008/09/jsonenc#object",
            "Algorithm":"//www.ibm.com/.../jsonenc#tripledes-cbc"
        },
        "KeyInfo": {
            "EncryptedKey": {
                "VersionId":"://www.ibm.com/2008/09/
                    jsonenc#EncryptedKey",
                "EncryptionMethod": {
                    "Algorithm": "//www.ibm.com/.../jsonenc#rsa-1_5",
                },
                "KeyInfo": {
                    "X509Data": {
                        "X509SKI": "R8ReX ... GNM="
                    }
                },
                "CipherData": {
                    "CipherValue":"yMTEyu0tAm1..."
                }
            }
        },
        "CipherData": {
            "CipherValue":"ydUNqHkMrD..."
        }
    }
  }
}
```

The following Example 5 is similar to Example 4, however, here the EncryptedKey is found using a RetrievalMethod instead of embedding it as a child object of the KeyInfo element. As can be seen in this example, at the root of the JSON document a list of EncryptedKeys contains an array of EncryptedKey JSON objects. In this example, there is one EncryptedKey that contains an identifier that matches the URI in the RetrievalMethod of the EncryptedData. EncryptedKeys can be mapped during parsing with an EncryptedKey. Id being the key, and the value would be the EncryptedKey data. This allows for quick retrieval of the EncryptedKey. The ReferenceList here is an object that contains pointers from a key value of an EncryptedKey to items encrypted by that key value (EncryptedData or EncryptedKey JSON objects).

```
{ "PaymentInfo": {
    "Name":"John Smith",
    "EncryptedData": {
        "VersionId":"//www.ibm.com/2008/09/
            jsonenc#EncryptedData",
        "Id":"CreditCard",
        "EncryptionMethod": {
            "Type":"//www.ibm.com/2008/09/
                jsonenc#object",
            "Algorithm":"//www.ibm.com/2008/09/
                jsonenc#tripledes-cbc"
        },
        "KeyInfo": {
            "RetrievalMethod": {
                "URI":"#ID_OF_ENCRYPTEDKEY",
                "Type":"http://www.ibm.com/2008/09/
                    jsonenc#EncryptedKey"
            },
        },
        "CipherData": {
            "CipherValue":"ydUNqHkMrD..."
        }
    },
    "EncryptedKeys":[
    {
        "EncryptedKey": {
            "VersionId":"//www.ibm.com/2008/09/
                jsonenc#EncryptedKey",
            "Id":"ID_OF_ENCRYPTEDKEY",
            "EncryptionMethod": {
                "Algorithm":"//www.ibm.com/2008/09/
                    jsonenc#rsa-1_5"
            },
            "KeyInfo": {
                "X509Data": {
                    "X509SKI":"R8ReXSe ... vWQWGNM="
                }
            },
            "CipherData": {
                "CipherValue":"xyzabc.."
            },
            "ReferenceList": [ {
                "DataReference": {
                    "URI":"#CreditCard"
                }
            } ],
            "CarriedKeyName":"Sally Doe"
        }
    }]
}
```

Example 6 below represents the JSON message of Example 1 following encryption of just the CreditCard number. This example is similar to that of Example 3 above, with the main difference being the EncryptionMethod Type value. The resulting decryption of the EncryptedData would result in a string that would be set as the value of the Number object:

```
{ "PaymentInfo": {
    "Name":"John Smith",
```

```
        "CreditCard": {
            "Limit":"5,000",
            "Currency":"USD",
            "Number": {
                "EncryptedData": {
                    "VersionId":".../jsonenc#EncryptedData",
                    "EncryptionMethod": {
                        "Type":".../jsonenc#string",
                        "Algorithm":" ... /jsonenc#tripledes-cbc"
                    },
                    "KeyInfo": {
                        "KeyName":"shared secret key name"
                    },
                    "CipherData": {
                        "CipherValue":"ydUNqHkMrD..."
                    }
                },
            },
            "Issuer":"Example Bank",
            "Expiration":"04\/02
        }
    }
}
```

Example 7 below represents the JSON message of Example 2 following encryption of the CreditCards[ ] JSON array. In this example, the result is very similar to Example 3 above, with the main difference once again being the EncryptionMethod Type. The resulting decryption of the EncryptedData would result in a string value that when parsed would result in a JSON array data type that would be added to the UserRecord in place of the EncryptedData:

```
{ "UserRecord ": {
    "Name":"John Smith",
    "EncryptedData": {
        "VersionId":"//www.ibm.com/ .../jsonenc#EncryptedData",
        "EncryptionMethod": {
            "Type": "http://www.ibm.com/2008/09/jsonenc#array",
            "Algorithm":"... /jsonenc#tripledes-cbc"
        },
        "KeyInfo": {
            "KeyName":"shared secret key name"
        },
        "CipherData": {
            "CipherValue":"ydUNqHkMrD..."
        }
    }
}
}
```

The particular encryption algorithms, keys and parameters used by the encryptor are not a feature of this disclosure. Thus, the encryption algorithms used to encrypt the data items in the JSON message may be any known techniques. Such as one or more of the following:
//www.ibm.com2008/09/jsonenc#aes128-cbc
//www.ibm.com2008/09/jsonenc#tripledes-cbc
//www.ibm.com/2008/09/jsonenc#rsa-1_5

These algorithms are merely representative, however, as any known or later-developed encryption algorithms may be used.

The techniques described herein are advantageous. The disclosed subject matter solves the problem of adding message encryption to JSON messages. Using the encryption syntax as described, a sending entity can encrypt all or parts of a JSON message supporting symmetric (shared secret) and asymmetric (public key) encryption methods. The advantage of using JSON over XML is that JSON is lightweight and fast to parse, resulting in increased performance and smaller footprint (on disk and memory). By implementing JSON message encryption in this manner, an additional layer of security (over and above any transport layer security) is provided to protect the data confidentiality of the communicated data. Thus, the data in the message is further secured against malicious altering by an attacker (who can compromise the transport security), or against accidental altering through transmission errors. Using this approach, the sending entity need not even use transport security.

Figure 8:
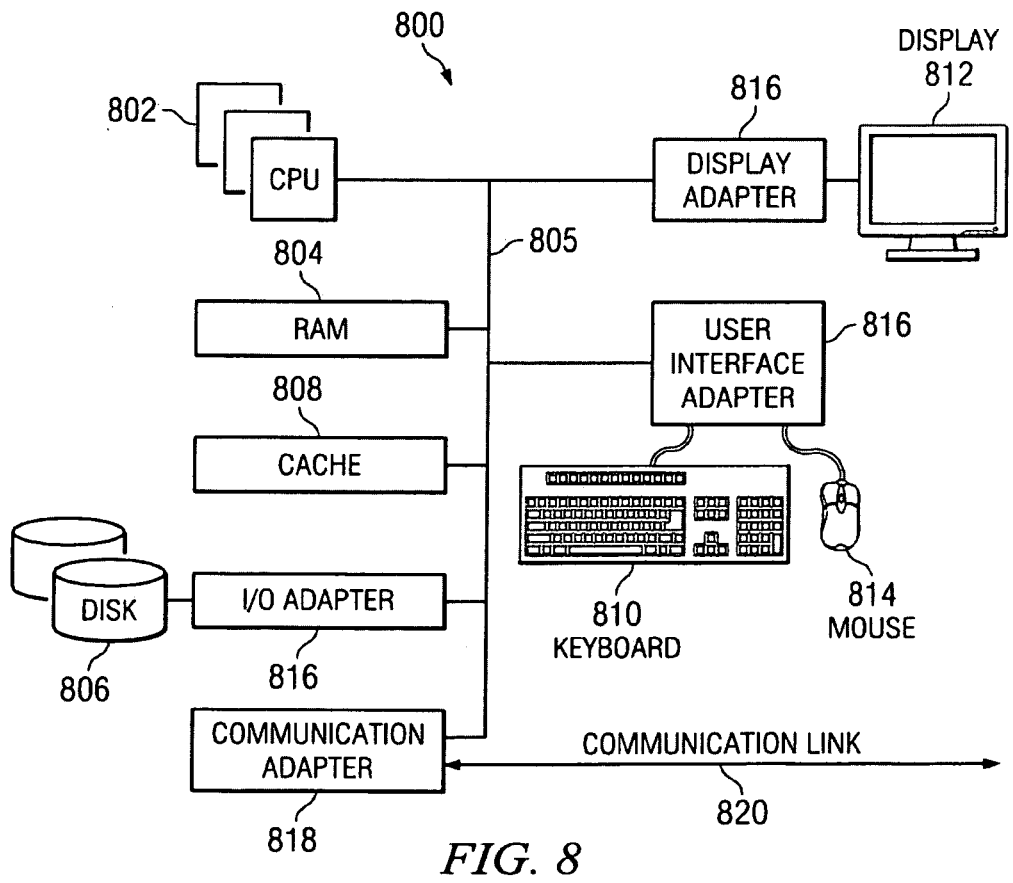
FIG. 8 is a block diagram of a representative data processing system in which the signature scheme may be implemented.

FIG. 8 illustrates a representative data processing system 800 for use as the sending or receiving entity. A data processing system 800 suitable for storing and/or executing program code will include at least one processor 802 coupled directly or indirectly to memory elements through a system bus 805. The memory elements can include local memory 804 employed during actual execution of the program code, bulk storage 806, and cache memories 808 that provide temporary storage of at least some program code to reduce the number of times code must be retrieved from bulk storage during execution. Input/output or I/O devices (including but not limited to keyboards 810, displays 812, pointing devices 814, etc.) can be coupled to the system either directly or through intervening I/O controllers 816. Network adapters 818 may also be coupled to the system to enable the data processing system to become coupled to other data processing systems or devices through intervening private or public networks 820. These data processing systems execute the encryptor or decryptor routines as described above.

"The disclosed subject matter can take the form of an entirely hardware embodiment, an entirely software embodiment or an embodiment containing both hardware and software elements. In one embodiment, the JSON encryption syntax and associated encryptor and decryptor routines are implemented in software, which includes but is not limited to firmware, resident software, microcode, and the like. Furthermore, as noted above, the disclosed subject matter can take the form of a computer program product accessible from a computer-usable or computer-readable medium providing program code for use by or in connection with a computer or any instruction execution system. For the purposes of this description, a computer-usable or computer readable medium can be any apparatus that can contain or store, the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read—only memory (ROM), a rigid magnetic disk and an optical disk. Current examples of optical disks include compact disk-read only memory (CD-ROM), compact disk—read/write (CD-R/W) and DVD. The transform and related functions may also be implemented as a service."

The encryptor and/or decryptor functions may be implemented as computer programs that are retrieved over a computer network. In one example embodiment, the encryptor or decryptor is a computer program product comprising a set of instructions (program code). The instructions are stored in a computer readable storage medium in a data processing system, and these instructions are downloaded over a network from a remote data processing system. In an alternative embodiment, the instructions are stored in a computer readable storage medium in a server data processing system, and the instructions are downloaded over a network to a remote data processing system for use in a computer readable storage medium with the remote system. The encryptor and/or decryptor functions may also be carried by a third party as a managed or hosted service offering.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The subject matter herein is not limited to encrypting JSON messages. The techniques may be applied to any text-based, data-interchange message format that is used to create a portable representation of structured data. Thus, the techniques described herein apply to encrypting structured data messages, where a structured data message comprises a collection of name/value pairs, and an ordered list of values. More generally, the techniques described herein may be generalized for use with respect to any structured data-interchange format. Examples of such alternative formats include those where the collection of name/value pairs is a record, a struct, a hash table, a keyed list or an associative array, or where the ordered list of values is realized as a vector, a list or a sequence.

Having described our invention, what we now claim is as follows:

1. A method to secure messages deliverable over a communication network, comprising:
   receiving, at an AJAX-enabled application, a JavaScript Object Notation (JSON) message comprising at least one data item;
   calling an encryptor function from the AJAX-enabled application to carry out a set of operations on the JSON message that include:
      serializing the at least one data item into a series of bit sequences;
      encrypting the series of bit sequences to generate a result;
      associating a data type with the result to generate a data object that represents an encryption of the data item in the JSON message, the data type including information that specifies how to recover the series of bit sequences after a subsequent decryption; and
      replacing the at least one data item with the data object to generate a modified JSON message; and
   returning the modified JSON message to the AJAX-enabled application and transmitting the modified JSON message over the communication network to another AJAX-enabled application.

2. The method as described in claim 1 wherein the set of operations carried out on the JSON message further include:
   including in the data object a key information element that includes information associated with an encryption key and an encryption method.

3. The method as described in claim 2 wherein the key information element includes a key value that results from applying a public key of a key pair to a symmetric key, the symmetric key being generated in association with encrypting the series of bit sequences.

4. The method as described in claim 1 wherein the data item is a JSON object, array, string, or other artifact within the JSON message, or any combination of such data, or the JSON message itself.

5. The method as described in claim 1 wherein each series of bit sequences is an octet.

6. The method as described in claim 1 wherein the data type is bound to a Uniform Resource Identifier (URI) at which the information resides.

7. An apparatus, comprising:
   a processor;
   computer memory holding computer program instructions executed by the processor to secure messages deliverable over a communication network by:
      receiving, at an AJAX-enabled application, JavaScript Object Notation (JSON) message comprising at least one data item;
      calling an encryptor function from the AJAX-enabled application to carry out a set of operations on the JSON message that include:
         serializing the at least one data item into a series of bit sequences;
         encrypting the series of bit sequences to generate a result;
         associating a data type with the result to generate a data object that represents an encryption of the data item in the JSON message, the data type including information that specifies how to recover the series of bit sequences after a subsequent decryption; and
         replacing the at least one data item with the data object to generate a modified JSON message; and
      returning the modified JSON message to the AJAX-enabled application and transmitting the modified JSON message over the communication network to another AJAX-enabled application.

8. The apparatus as described in claim 7 wherein the computer program instructions are further executed by the processor to include in the data object a key information element that includes information associated with an encryption key and an encryption method.

9. The apparatus as described in claim 8 wherein the key information element includes a key value that results from applying a public key of a key pair to a symmetric key, the symmetric key being generated in association with encrypting the series of bit sequences.

10. The apparatus as described in claim 7 wherein the data item is a JSON object, array, string, or other artifact within the JSON message, or any combination of such data, or the JSON message itself.

11. The apparatus as described in claim 7 wherein each series of bit sequences is an octet.

12. The apparatus as described in claim 7 wherein the data type is bound to a Uniform Resource Identifier (URI) at which the information resides.

13. A product, comprising:
   a non-transitory computer readable storage device; and
   computer readable instructions stored by the storage device;
   wherein the computer readable instructions include instruction sets respectively written to cause a computer to secure messages deliverable over a communications network by:
      receiving, at an AJAX-enabled application, JavaScript Object Notation (JSON) message comprising at least one data item;

calling an encryptor function from the AJAX-enabled application to carry out a set of operations on the JSON message that include:
  serializing the at least one data item into a series of bit sequences;
  encrypting the series of bit sequences to generate a result;
  associating a data type with the result to generate a data object that represents an encryption of the data item in the JSON message, the data type including information that specifies how to recover the series of bit sequences after a subsequent decryption; and
  replacing the at least one data item with the data object to generate a modified JSON message; and
  returning the modified JSON message to the AJAX-enabled application and transmitting the modified JSON message over the communication network to another AJAX-enabled application.

14. The product as described in claim 13 further including instructions sets that include in the data object a key information element that includes information associated with an encryption key and an encryption method.

15. The product as described in claim 14 wherein the key information element includes a key value that results from applying a public key of a key pair to a symmetric key, the symmetric key being generated in association with encrypting the series of bit sequences.

16. The product as described in claim 13 wherein the data item is a JSON object, array, string, or other artifact within the JSON message, or any combination of such data, or the JSON message itself.

17. The product as described in claim 13 wherein each series of bit sequences is an octet.

18. The product as described in claim 13 wherein the data type is bound to a Uniform Resource Identifier (URI) at which the information resides.

19. A method to secure messages deliverable over a communication network, comprising:
  receiving, at an AJAX-enabled application, a modified JavaScript Object Notation (JSON) message that has been generated according to the following sender-side operations:
    receiving a JavaScript Object Notation (JSON) message comprising at least one data item;
    serializing the at least one data item into a series of bit sequences;
    encrypting the series of bit sequences to generate a result;
    associating a data type with the result to generate a data object that represents an encryption of the data item in the JSON message, the data type including information that specifies how to recover the series of bit sequences after a subsequent decryption; and
    replacing the at least one data item with the data object to generate a modified JSON message; and
  calling a decryptor function from the AJAX-enabled application to process the modified JSON message to recover in cleartext the JSON message comprising the at least one data item; and
  returning the JSON message in cleartext to the AJAX-enabled application.

20. The method as described in claim 19 wherein processing the modified JSON message includes:
  obtaining a decryption key;
  decrypting the data object and recovering the series of bit sequences; and
  interpreting the series of bit sequences according to the information to deserialize the series of bit sequences and recover the data item.

21. The method as described in claim 19 wherein the modified JSON message also includes a key information element that includes a key value that results from applying a public key of a key pair to a symmetric key, the symmetric key having been generated in association with encrypting the series of bit sequences, and
  wherein processing the modified JSON message further includes:
    generating the symmetric key using a private key of the key pair; and
    using the symmetric key so generated to decrypt the data object.

* * * * *